No. 743,431.

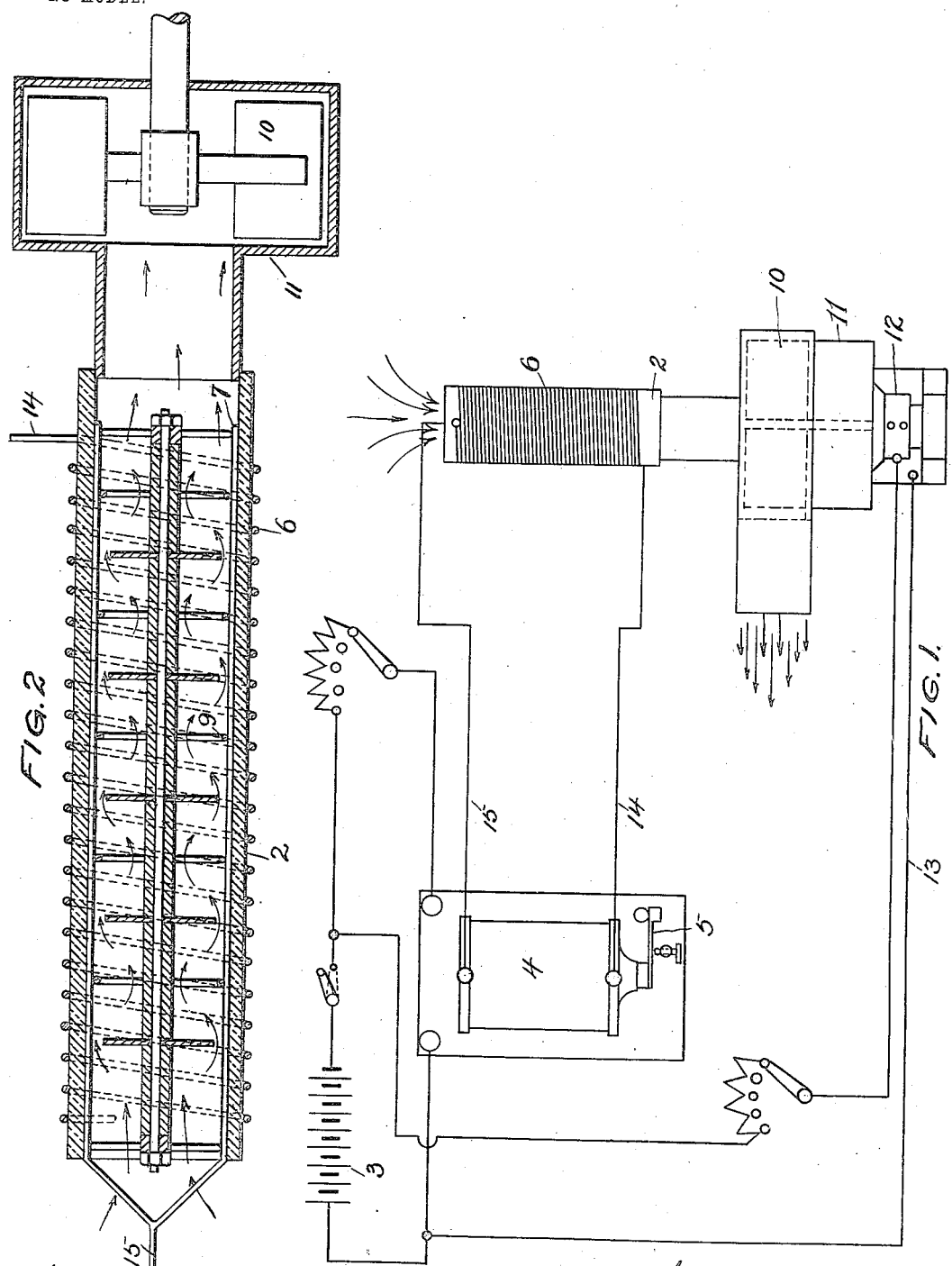

Patented November 10, 1903.

UNITED STATES PATENT OFFICE.

FREDERICK S. BLACKMARR AND JOSEPH L. WILLFORD, OF MINNEAPOLIS, MINNESOTA.

METHOD OF CONVERTING OXYGEN INTO OZONE.

SPECIFICATION forming part of Letters Patent No. 743,431, dated November 10, 1903.

Application filed April 26, 1902. Serial No. 104,828. (No specimens.)

*To all whom it may concern:*

Be it known that we, FREDERICK S. BLACKMARR and JOSEPH L. WILLFORD, of Minneapolis, Hennepin county, Minnesota, have invented a new and useful Method of Converting Oxygen into Ozone, of which the following is a specification.

Our invention relates to improvements in the method of converting oxygen into ozone; and the object we have in view is to secure this result without the production of sparks, thereby avoiding the production of oxids.

In the accompanying drawings, forming part of this specification, Figure 1 is a plan view of an apparatus that may be used for carrying our invention into effect. Fig. 2 is a longitudinal section of the converter.

In carrying out our invention we provide a wall of any dielectric substance, such as glass, mica, earthenware, lava, vulcanized rubber, or any other suitable material. This wall may be in any suitable form. We prefer to construct it in the form of a glass tube 2, having open ends.

3 represents a suitable storage or other battery, or it may be an electric generator instead.

4 represents an ordinary induction-coil provided with a suitable circuit-breaker 5, said coil being in circuit with the battery 3. The glass tube 2 is provided on its outer surface with a number of metallic coils 6 and upon its inner surface with a number of longitudinal wires 7. These two sets of wires are preferably arranged one within and the other without the glass tube, the inner wires being all preferably connected by the series of bands or coils 9. The wires upon the outer surface and the wires upon the inner surface of the glass tube form the terminals of the secondary electric circuit of the induction-coil, and the glass tube is a dielectric substance arranged between said terminals, so that we secure a silent discharge of electricity from one terminal to the other through the glass tube or wall. This tube or wall prevents any sparking of the electric current, thereby causing a silent or "glow" discharge. We may provide any suitable means for passing oxygen or air through the converter-tube 2 or along the wall of the dielectric, and thus into the field of the silent electric discharge. We have here shown a suitable fan 10, arranged within a casing 11, that is connected to one end of the converter 2. The fan 10 is driven, preferably, by a suitable electric motor 12, and said motor is connected to the battery 3 by suitable wires 13. From the induction-coil 4 wires 14 and 15 extend to the terminals connected with the converter. The wire 14, as here shown, extends to the series of wires or coils 6, arranged upon the outside of the converter, and the wire 15 extends to the series of wires 7, arranged upon the inside of the converter.

Our method of converting oxygen into ozone consists in applying an interrupted electric current to the opposite sides of a wall formed of a dielectric substance or material. With the apparatus that we have illustrated in the drawings this wall is in the form of a glass tube or cylinder, and the interrupted electric current is applied to the opposite sides of this wall through the terminals of the secondary circuit of the induction-coil, one of said terminals consisting of the series of wires upon the inner surface of the cylinder and the other terminal consisting of a series of wires upon the outer surface of the cylinder. Interposition of the dielectric substance between the terminals of the induction-coil prevents any sparking between said terminals and causes a continuous silent discharge from one terminal to the other through the wall of the tube or cylinder. Oxygen of the air which is brought in proximity to the inner wall of the tube or cylinder is by the action of the electric current condensed and converted into ozone. When pure oxygen is passed through the tube, pure ozone will be produced. Ordinarily, however, we pass atmospheric air through the cylinder, and ozonized air is the result of the process. This ozonized air may be used for many different purposes. It may be used for inhaling or for other applications to the human body. It may be used as a disinfectant or germicide. It may be used in house or hospital ventilation and for the treatment of meats or other perishable articles. It may also be applied with especially favorable results to the ozonizing of water. By impregnating water with the ozonized air nearly all of the bacteria in the water will be destroyed.

We have demonstrated by accurate tests that by this method ninety per cent. of the bacteria in water may be destroyed.

It is the aim of our process to provide a greater quantity of oxygen than normal in any given volume of air. We do not attempt to diminish the nitrogen of the air, but by increasing the density of the oxygen we secure three parts of oxygen in place of two parts in the same volume of air. In other words, we convert three parts of oxygen into two parts of its allotropic form, ozone, and hence we increase the density of the oxygen and add to the amount that is in the air that is inhaled or used for other purposes. It is a gas that may readily be breathed without deleterious effects, and it is very beneficial in cases of catarrhal and bronchial affections or of any diseases of the respiratory organs. It is also a germicide and disinfectant of great merit.

We do not in this application claim the apparatus herein shown and described, having claimed the same in a separate application, Serial No. 104,829, filed April 26, 1902.

We claim as our invention—

1. The method of converting oxygen into ozone, consisting in applying an induced electric current to the opposite sides of a wall of dielectrical material, through terminals which are at all points in contact with said wall, and passing air or oxygen along said wall, in proximity to one of said terminals.

2. The method of converting oxygen into ozone, consisting in applying an induced electric current to the inner and outer surfaces of a tube formed of dielectric material through electric terminals, each of which is at all points in contact with one of the surfaces of said tube, and passing air or oxygen through said tube.

In witness whereof we have hereunto set our hands this 22d day of April, 1902.

FREDERICK S. BLACKMARR.
JOSEPH L. WILLFORD.

In presence of—
A. C. PAUL,
C. G. HANSON.